Nov. 26, 1929.  J. W. ROE  1,737,390
DIFFERENTIAL
Filed Jan. 12, 1927    2 Sheets-Sheet 1

INVENTOR
John W. Roe
BY F. E. Sherman
ATTORNEY

Nov. 26, 1929. J. W. ROE 1,737,390
DIFFERENTIAL
Filed Jan. 12, 1927 2 Sheets-Sheet 2

John W. Roe
INVENTOR
BY F. E. Shannon
ATTORNEY

Patented Nov. 26, 1929

1,737,390

UNITED STATES PATENT OFFICE

JOHN W. ROE, OF AKRON, OHIO, ASSIGNOR TO HIMSELF AND JOSEPH DAVIS, OF AKRON, OHIO

DIFFERENTIAL

Application filed January 12, 1927. Serial No. 160,619.

This invention relates to new and novel improvements in differential mechanism and while the invention may be applied generally, wherever a differential movement is desired, it is particularly adapted for use to operatively connect the drive shaft and rear wheels of a motor driven vehicle.

Objects of the invention are to provide a differential mechanism of new and novel construction which may be manufactured at a relatively low cost and which will be strong and durable and extremely efficient in use.

In the ordinary differential mechanism beveled gears are employed to operatively connect the driving member and the rear axles. During the operation of the mechanism the full force of the driving member is in turn on a few teeth at a time. During the operation of a motor vehicle, the differential mechanism is not always in operation and the full driving force is held by a few teeth on each gear, sometimes for a considerable period of time. This often results in the breaking of the teeth on which the driving force is exerted, thus rendering the mechanism unfit for use.

It is an object of this invention to provide a differential mechanism in which a driving member is operatively connected to two driven members by a series of balls thereby eliminating considerable friction and giving a driving connection at a plurality of points distributed in spaced relation around a considerable extent, of both driving and driven members and to thereby provide a differential mechanism which will be exceedingly strong and durable and which will not be easily broken.

The above objects are accomplished and additional ends are attained by the novel construction, combination and arrangement of parts hereinafter described and illustrated in the accompanying drawing in which I have shown a preferred embodiment of the invention, it being understood that the invention is capable of various adaptations and that changes and modifications may be made or resort had to substitutions which come within the scope of the appended claims.

In the drawings like characters of reference are employed to designate like parts as the same may appear in any of the several views and in which:—

Figure 1:
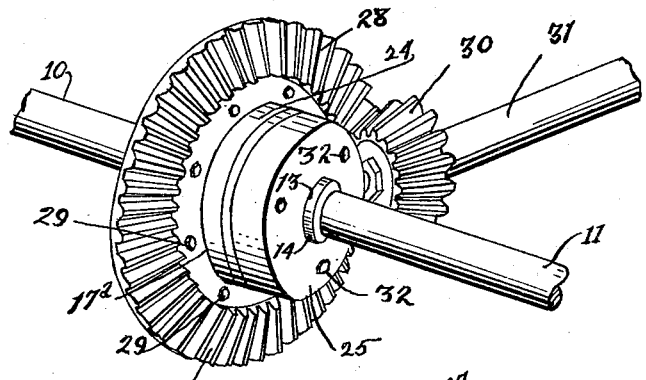
Figure 1 is a perspective view showing a differential mechanism constructed in accordance with this invention and illustrating the manner in which it is operatively connected to the drive shaft and rear axles.
Figure 2:
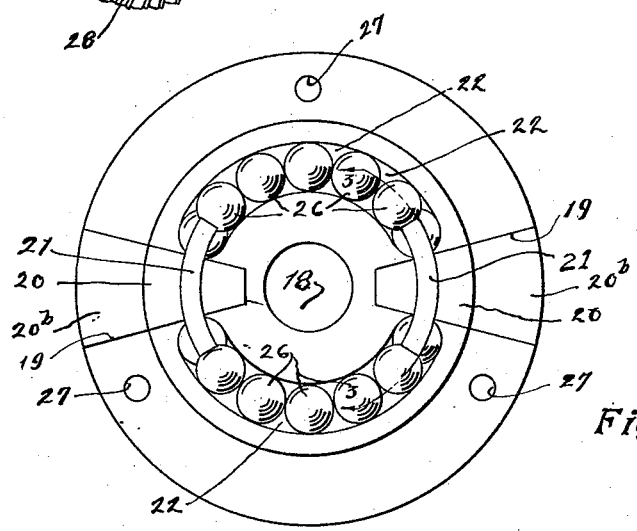
Figure 2 is a plan view of the central member of the differential mechanism.
Figure 3:
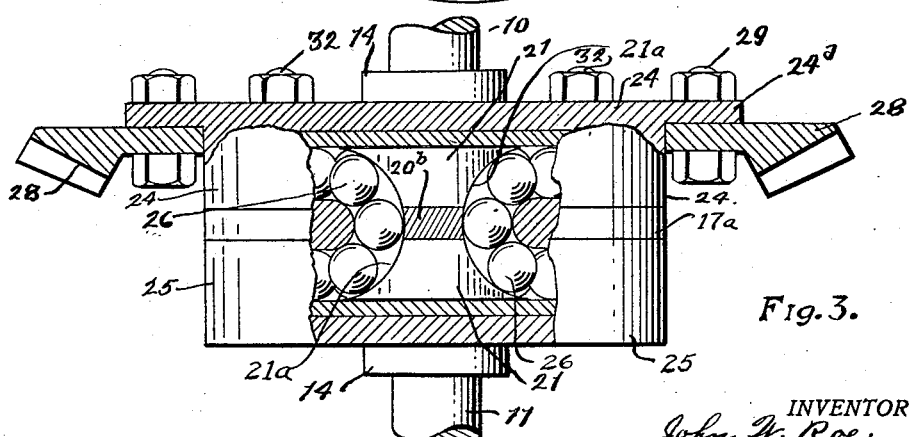
Figure 3 is a side elevational view of the differential mechanism constructed in accordance with this invention the same being broken away and partly shown in cross section.
Figure 4:
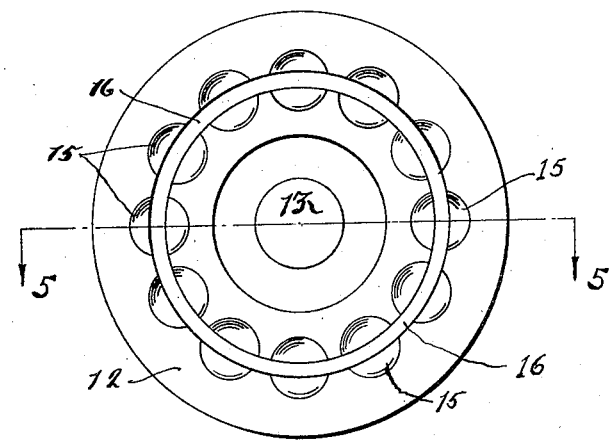
Figure 4 is a plan view of one of the driven members employed in carrying out the invention.

Proceeding now to a detailed description of the invention with reference to the adaptation thereof disclosed in the drawings, the numerals 10 and 11 are used to denote the rear axles of a vehicle. The numeral 12 is used to denote a circular plate which is provided with an axial bore 13. One of the plates 12 is mounted on the inner end of each of the axles 10 and 11. Each plate 12 is provided with the hub 14 which projects outwardly therefrom and each plate is also provided on the inner face thereof with a concentrically arranged, circumferentially extending series of recesses 15 which are formed to receive a spherical surface. The recesses 15 are adapted to receive series of balls and hold the same in position with balls in adjacent recesses in contact with each other. Each plate 12 is also provided on the inner face thereof with a concentrically arranged annular groove 16 which is formed therein so as to be positioned centrally of each recess 15. It will be noted by reference to Figure 5 that the groove 16 is substantially deeper than the recesses 15. The numeral 17 denotes a circular plate which forms the central portion of the differential. The plate 17 is provided with an axial bore 18 which is adapted to receive the inwardly projecting ends of the axles 10 and 11. The plate 17 is also provided on diametrically opposed sides thereof with the sector shaped opening 19 which projects therein from the outer edge thereof and terminates in spaced relation to the opening 18. The numeral 20 denotes wedge-shaped members, one of which is fitted in each opening 19. The main body of each wedge member 20 is of the same cross sectional contour as the plate 17 and the plate 17 with the wedges 20 positioned in the openings 19 form a complete circular plate. The plate 17 is provided on each axial face thereof with two diametrically opposed arcuate grooves 22 which are of semi-circular cross section and are concentrically arranged thereon. The plate 17 is also provided on each side of each opening 18 with a notch or opening 23 which is formed therein so as to coincide with one of the grooves 22. The side walls of each opening 23 are concentrically arranged on the plate 17, while the bottom wall of said opening is formed of circular cross section and is arranged to meet the bottom wall of the groove 22 thereby forming a race-way which extends in an arcuate path on each side of the plate 17 and through the openings 23. The members 20 are provided on each lateral side thereof with an outwardly projecting arcuate lug 21. Each lug 21 is positioned centrally of one of the grooves 22. Each lug 21 constitutes a portion of a hollow cylinder and the axial edge of each lug is adapted to fit in the annular grooves 16 in one of the plates 12. Each lug 21 is provided with an outwardly diverging, inwardly curved, lateral face 21$^a$ which is presented toward the opening 23. The sector member 20 is also provided with an inwardly curved surface 20$^a$ which coincides with the face 21$^a$ thereby forming a continuous, arcuate surface which extends from the bottom of the groove 16 on one plate 12 to the bottom of the groove 16 in the other plate 12 when the differential parts are operatively secured in assembled relation. The arcuate surfaces formed by the faces 21$^a$ and 20$^a$ are disposed in the path of the rows of balls carried in the grooves 22 and in the recesses 15 as hereinafter described. The center plate 17 is provided upon the peripheral face thereof with a circumferentially disposed, outwardly projecting flange 17$^a$. The sector member 20 is likewise provided with an outwardly projecting flange 20$^b$ which, when the sector members are fitted in the openings 19, coincide with the flange 17$^a$, thus forming a complete circular body.

The numerals 24 and 25 denote housing sections, each of which is provided with a cylindrical cavity adapted to receive the plates 12 and the central member 17. Each of the housing members 24 and 25 are provided on the closed end thereof with a bore adapted to receive one of the hubs 14 on one of the members 12.

One of the housing members 24 is provided on one end thereof with an outwardly projecting, circumferentially extending flange 24$^a$. A beveled ring gear 28 is secured to the flange 24$^a$ by means of the bolts 29 or other suitable means. The numeral 30 denotes a beveled gear which is fixed to a drive shaft 31 and which is operatively meshed with the gear 28.

Figure 5:
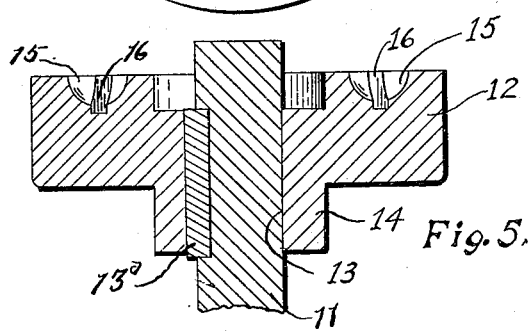
Figure 5 is a cross sectional view showing a driven member and a portion of a vehicle axle operatively mounted thereon.
Figures 6, 7:
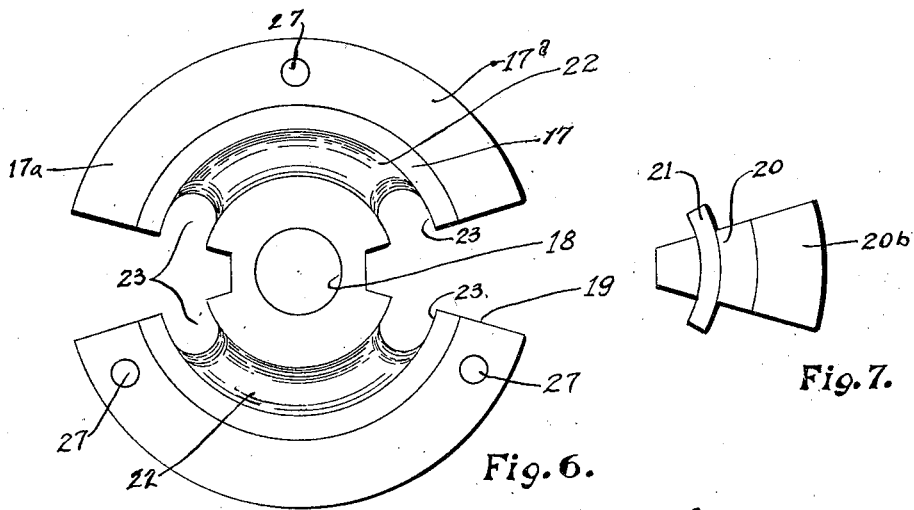
Figure 6 is a plan view of the central member employed in carrying out the invention.
Figure 7 is a plan view of one of the blocks which forms a part of the central portion of the differential.

In assembling my improved device, one of the plates 12 is non-rotatably secured to the inner end of each axle 10 and 11 as shown in Figure 5 by means of the key 13$^a$ or other suitable means. The hub 14 is then entered in the axial bore 13 in one of the housing members 24 and 25 with the plate 12 positioned within the housing. The central plate 17 is then positioned between the plates 12. The sector member 20 is placed in each opening 18 with each arcuate lug 21 disposed in one of the grooves 16 in the plates 12. A ball 26 is placed in each of the recesses 15 except the recesses occupied by the lugs 21. The openings 23 and the arcuate grooves 22 are then filled with the balls 26, thus forming two endless rows of balls which extend through the central plate 17 and are positioned in the grooves 22 on each side thereof.

The flange 17$^a$ is provided at a plurality of points with bores 27 and the differential housing members are likewise provided with suitable bores through which bolts are positioned to secure the central plate 17 to the housing members 24 and 25 and to secure the housing members together.

When used as a differential in a motor vehicle, the mechanism herein shown and described is placed in the rear axle housing with the axles 10 and 11 operatively connected to the rear wheels and the drive shaft 31 operatively connected to the engine or other source of power. It will be noted that a plate 17 is rigidly secured to the housing members so as to extend centrally therebetween and that the said member 17 partitions the housing into two equal cavities. A member 12 is rotatably mounted in each of these cavities. As a plurality of balls in each row are seated in the cavities 15 in each of the members 12, a rotary movement of the member 17 will cause a rotary movement of the members 12 and of the axles 10 and 11. During the turning movement of the vehicle, one of the axles 10 or 11 must turn slower than the other. In this event the speed of rotation on one of these plates 12 is decreased causing the said plate 12 to move relative to the plate 17. This causes a longitudinal movement of the row of balls 26. As the row of balls are thus moved longitudinally, the balls on one side of the plate 17 pass through the plate 23 to the other side of the plate and are in turn entered in one of the seats 15 in the other plate 12.

Each row of balls 26 is thus mounted in an endless loop with opposite sides of each loop positioned on opposite sides of the plate 17. As one of the plates 12 are moved relative to the plate 17, the balls are successively moved against one of the wedge-like members 21 and are carried in an arcuate path in the seat 21ᵃ to the other side of the member 12. It will thus be seen that I have provided a differential mechanism of simple, inexpensive construction which will operate with a minimum of friction and which will be very efficient and durable.

Having thus illustrated my invention and described the same in detail, what I claim as new and desire to secure by Letters Patent is:

1. In a differential mechanism, a central member, coaxially arranged disk members rotatably mounted on each side thereof in abutting relation thereto, each of said disk members provided on the abutting face thereof with a circumferentially extending concentrically arranged row of seats, each disk member also provided with a concentrically arranged annular channel which extends centrally through said row of seats, said channel being deeper than said seats, arcuate grooves in each abutting face of said central member, said arcuate grooves coinciding with the row of seats on the adjacent disk, each of said grooves arranged exactly opposite a like groove on the opposite side of said central member, said central member provided with openings which extend therethrough at each end of each groove, thereby forming a passage between the like ends of like grooves on opposite sides of said central member, an arcuate lug carried by said central member on each side thereof at each end of each of said grooves, each of said lugs having an inwardly curved face terminating in a point, the outer edge of said lugs positioned in said channel, an endless row of balls mounted in said seats and extending through said openings the balls in each row entered in the adjacent seats in both of said disks.

2. In a differential mechanism, a rotatable central member and two disk members, one of said disk members rotatably mounted on each side of said central member in coaxial abutment therewith, each of said disk members provided on the abutting face thereof with a circumferentially extending concentrically arranged row of seats, and having a circumferentially extending annular channel which extends centrally through said row of seats, said central member provided on each abutting face with arcuate grooves, said arcuate grooves coinciding with the row of seats on the adjacent disk, each of said grooves arranged exactly opposite a like groove on the opposite side of said central member, said central member provided with openings which extend therethrough at each end of each groove, thereby forming an endless race extending on opposite sides of said central member, a concentrically arranged arcuate lug projecting from said central member and entered in said channel, each of said lugs forming a part of said race, said lug provided with overhanging, inwardly arched end portions, an endless row of balls mounted in said race, the balls on each side of said central member received in the seats of the adjacent disks.

3. In a differential mechanism, a rotatable housing, a central member fixed therein, a coaxially arranged disk member rotatably mounted in said housing on each side of said central member, each of said disk members provided on the abutting face thereof with a circumferentially extending, concentrically arranged channel, said abutting face provided with ball engaging seats each positioned centrally of said channel, said seats arranged in a row extending longitudinally of said channel, arcuate grooves in each abutting face of said central member, said arcuate grooves coinciding with the row of seats on the adjacent disk, each of said grooves arranged exactly opposite a like groove on the opposite side of said central member, said central member provided with openings which extend therethrough at each end of each groove, thereby forming an endless ball race extending on opposite sides of said central member, lugs projecting from each side of said central member, said lugs entered in said channel, each of said lugs provided at each end thereof with an overhanging portion having an inwardly arched surface terminating in a sharp edge, an endless row of balls mounted in said race the balls presented on each side of said central member entered in the seats of the adjacent disk.

In testimony whereof I have hereunto set my hand.

JOHN W. ROE.